(12) United States Patent
Brooks

(10) Patent No.: US 9,737,789 B2
(45) Date of Patent: Aug. 22, 2017

(54) DUAL WHEEL ASSEMBLIES FOR SKATEBOARDS AND RELATED METHODS

(71) Applicant: Paul Brooks, Salt Lake City, UT (US)

(72) Inventor: Paul Brooks, Salt Lake City, UT (US)

( * ) Notice: Subject to any disclaimer, the term of this patent is extended or adjusted under 35 U.S.C. 154(b) by 0 days.

(21) Appl. No.: 14/988,299

(22) Filed: Jan. 5, 2016

(65) Prior Publication Data

US 2017/0189789 A1   Jul. 6, 2017

(51) Int. Cl.
| | | |
|---|---|---|
| *A63C 17/02* | (2006.01) | |
| *A63C 17/01* | (2006.01) | |
| *B60B 19/12* | (2006.01) | |
| *B60B 11/02* | (2006.01) | |

(52) U.S. Cl.
CPC ........... *A63C 17/015* (2013.01); *B60B 11/02* (2013.01); *B60B 19/12* (2013.01); *B60B 2320/10* (2013.01); *B60Y 2200/80* (2013.01)

(58) Field of Classification Search
CPC ......... A63C 17/02; A63C 17/04; A63C 17/01; A63C 17/015; A63C 17/22
See application file for complete search history.

(56) References Cited

U.S. PATENT DOCUMENTS

| | | | |
|---|---|---|---|
| 37,305 A | 1/1863 | Plimpton | |
| 308,990 A | 12/1884 | Richardson | |
| 330,093 A * | 11/1885 | Brown | A63C 17/22 301/5.7 |
| 568,025 A | 9/1896 | Graessle | |
| 1,469,344 A | 10/1923 | Ware | |
| 1,936,701 A * | 11/1933 | Wilson | B60B 33/0042 16/18 A |
| 2,164,805 A * | 7/1939 | Ecton | A63C 17/22 280/11.26 |
| 2,669,485 A | 2/1954 | Newman | |
| 2,697,010 A | 12/1954 | Hirschmugl | |
| 2,734,777 A * | 2/1956 | Jewett | A63C 17/22 301/5.7 |
| 2,914,334 A * | 11/1959 | Michnoff | A63C 17/18 280/7.13 |
| 3,271,723 A | 9/1966 | Willing | |
| 3,414,280 A * | 12/1968 | Kazuo | A63C 17/22 280/11.19 |
| 3,992,025 A * | 11/1976 | Amelio | A63C 17/22 280/87.042 |
| 4,114,952 A | 9/1978 | Kimmell | |
| 4,492,385 A | 1/1985 | Olson | |
| 5,330,214 A | 7/1994 | Brooks et al. | |

(Continued)

*Primary Examiner* — Erez Gurari
(74) *Attorney, Agent, or Firm* — TraskBritt

(57) ABSTRACT

A wheel for a skateboard may include a bearing assembly, an annular rim coupled to and extending annularly around the bearing assembly, and a tapered tire portion coupled to and extending annularly around the annular rim. A dual wheel assembly may include a first wheel disposed on a longitudinal end portion of an axle, a spacer disposed on the longitudinal end portion of the axle adjacent to the first wheel and abutting against the first wheel, and a second wheel disposed on the longitudinal end portion of the axle adjacent to the spacer and abutting against the spacer. A method of making a dual wheel assembly may include disposing a first wheel on an axle, disposing a spacer on the axle adjacent to the first wheel, and disposing a second wheel on the axle adjacent to the spacer.

14 Claims, 6 Drawing Sheets

(56) References Cited

U.S. PATENT DOCUMENTS

| | | | |
|---|---|---|---|
| 5,478,140 A | 12/1995 | Racosky | |
| 5,513,865 A | 5/1996 | Brooks et al. | |
| 5,673,941 A * | 10/1997 | Osawa | A63C 17/04 280/11.28 |
| 5,697,622 A * | 12/1997 | Warinner | A63C 17/04 188/5 |
| 5,730,520 A * | 3/1998 | Hsu | A63C 17/26 362/103 |
| 5,803,473 A * | 9/1998 | Bouden | A63C 17/01 280/11.19 |
| 6,065,763 A * | 5/2000 | Adams, Jr. | A63C 17/0046 280/11.19 |
| 6,375,204 B1 * | 4/2002 | Tu | A63B 22/16 280/11.27 |
| 7,073,799 B2 | 7/2006 | Gorisch | |
| 7,311,318 B1 * | 12/2007 | Funk | A63C 17/22 280/87.042 |
| 7,419,168 B2 | 9/2008 | Felty | |
| 8,251,384 B1 | 8/2012 | Christensen et al. | |
| 8,978,835 B1 * | 3/2015 | Larock | A63C 17/1409 188/1.12 |
| 2013/0099457 A1 * | 4/2013 | Alexander | A63C 17/22 280/11.223 |

\* cited by examiner

DUAL WHEEL ASSEMBLIES FOR SKATEBOARDS AND RELATED METHODS

TECHNICAL FIELD

This disclosure relates generally to wheels and wheel assemblies for use with skateboards, roller skates, scooters, etc. Specifically, this disclosure relates to dual wheel assemblies.

BACKGROUND

Many wheel assemblies for skateboards, rollers skates, longboards, scooters, etc., have beginnings in a skate wheel design described in the U.S. Pat. No. 37,305, to Plimpton, issued Jan. 6, 1863 (hereinafter "Plimpton"). The small, wooden wheels of Plimpton have wide flat bottoms due to a tendency of the wooden wheels to slip on the smooth wooden floor of a roller rink. Skate wheels were later improved by an addition of bearing assemblies as described in U.S. Pat. No. 308,990, to Richardson, issued Dec. 9, 1884. Skate wheels were further improved in an effort to replace the wooden tire with a rubber tire, as described in U.S. Pat. No. 2,669,485, to Newman, issued Feb. 16, 1954. Beginning in the 1960's, skate wheels began to be increasingly used on roads because of the emergence of outdoor skates and the introduction of the skateboard. An example of a wheel for a skateboard for outdoor use is described in U.S. Pat. No. 4,114,952 to Kimmel, issued Sep. 19, 1978.

Wheel assemblies were later improved as an inline roller skate, as described in U.S. Pat. No. 4,492,385, to Olson et al., issued Jan. 8, 1985. Subsequent success of the inline skate underscored disadvantages inherent in using a wide and flat tire on a less than smooth surface. For example, the disadvantages include increased rolling resistance. Furthermore, wide and flat tires experience additional resistance during turns since an outer portion of the tire is being pushed to rotate faster than an inner portion of the tire. As a result, the tires wear unevenly, which decreases a lifetime of the tire and can lead to rougher (e.g., bumpier) rides on the skateboard or roller skate. Moreover, wide and flat tires are more likely to be slowed or stopped by obstacles (e.g., rocks, pebbles, cracks, road debris, etc.) during use because the width of the wide and flat tires inhibits the obstacles from being pushed to a side of the tire. Additionally, the wide and flat tires require a significant amount of material, and therefore cost, to manufacture. Likewise, wide and flat surfaces of the wide and flat tire are less than ideal for gripping wet surfaces, and even when grooves are cut into the wide and flat tire to enhance grip (e.g., traction), the grooves quickly fill with dirt, tar, and other road debris, rendering the grooves ineffective.

Other improvements to skate wheels include steering mechanisms as described in U.S. Pat. No. 5,330,214, to Brooks et al., issued Jul. 19, 1994, and large troughs in centers of the skate wheels as described in U.S. Pat. No. 7,311,318, to Funk, issued Dec. 25, 2007.

BRIEF SUMMARY

Some embodiments of the present disclosure include a wheel for a skateboard. The wheel for a skateboard may include a bearing assembly, an annular rim coupled to and extending annularly around the bearing assembly, and a tapered tire portion coupled to and extending annularly around the annular rim. The tire portion may include a first frustoconical side surface, a second opposite frustoconical side surface, and a radially outermost surface extending between the first frustoconical side surface and the second frustoconical side surface, wherein a first acute angle may be defined between each of the first frustoconical side surface and the second frustoconical side surface and a plane extending through a center of the wheel and orthogonal to an axis of rotation of the wheel. The annular rim may include two lateral side surfaces extending from an interface between the annular rim and the tire portion to an interface between the annular rim and the bearing assembly, wherein a second acute angle may be defined between each of the two lateral side surfaces and the plane extending through the center of the wheel.

Some embodiments of the present disclosure include a dual wheel assembly for a skateboard. The dual wheel assembly may include a first wheel disposed on a longitudinal end portion of an axle, a spacer disposed on the longitudinal end portion of the axle adjacent to the first wheel and abutting against the first wheel, and a second wheel disposed on the longitudinal end portion of the axle adjacent to the spacer and abutting against the spacer, wherein the first wheel is separated from the second wheel by a distance by the spacer.

Some embodiments of the present disclosure include a method of making a dual wheel assembly for a skateboard. The method may include disposing a first wheel on a thin portion of an axle and abutting the first wheel against a thick portion of the axle, disposing a spacer on the thin portion of the axle adjacent to the first wheel, and disposing a second wheel on the thin portion of axle adjacent to the spacer, the spacer separating the first wheel from the second wheel by a distance.

BRIEF DESCRIPTION OF THE DRAWINGS

For a detailed understanding of the present disclosure, reference should be made to the following detailed description, taken in conjunction with the accompanying drawings, in which like elements have generally been designated with like numerals, and wherein.

DETAILED DESCRIPTION

The illustrations presented herein are not actual views of any particular wheel, wheel assembly, skateboard, or any component, but are merely idealized representations, which are employed to describe the present invention.

As used herein, any relational term, such as "first," "second," "top," "bottom," etc., is used for clarity and convenience in understanding the disclosure and accompanying drawings, and does not connote or depend on any specific preference or order, except where the context clearly indicates otherwise.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

Embodiments of the present disclosure include wheel assemblies for use with skateboards, rollers skates, scooters, longboards, etc. Some embodiments of the present disclosure include dual wheel assemblies that include a first wheel, a second wheel, a spacer, and a nut (e.g., a locking nut) disposed on a longitudinal end portion of an axle. The first and second wheels may rotate relative to one another and may define a space (e.g., trough) therebetween. The space may help provide a smoother ride for a user by allowing debris to be pushed between the wheels instead of having the wheels go over the debris.

Figure 1:
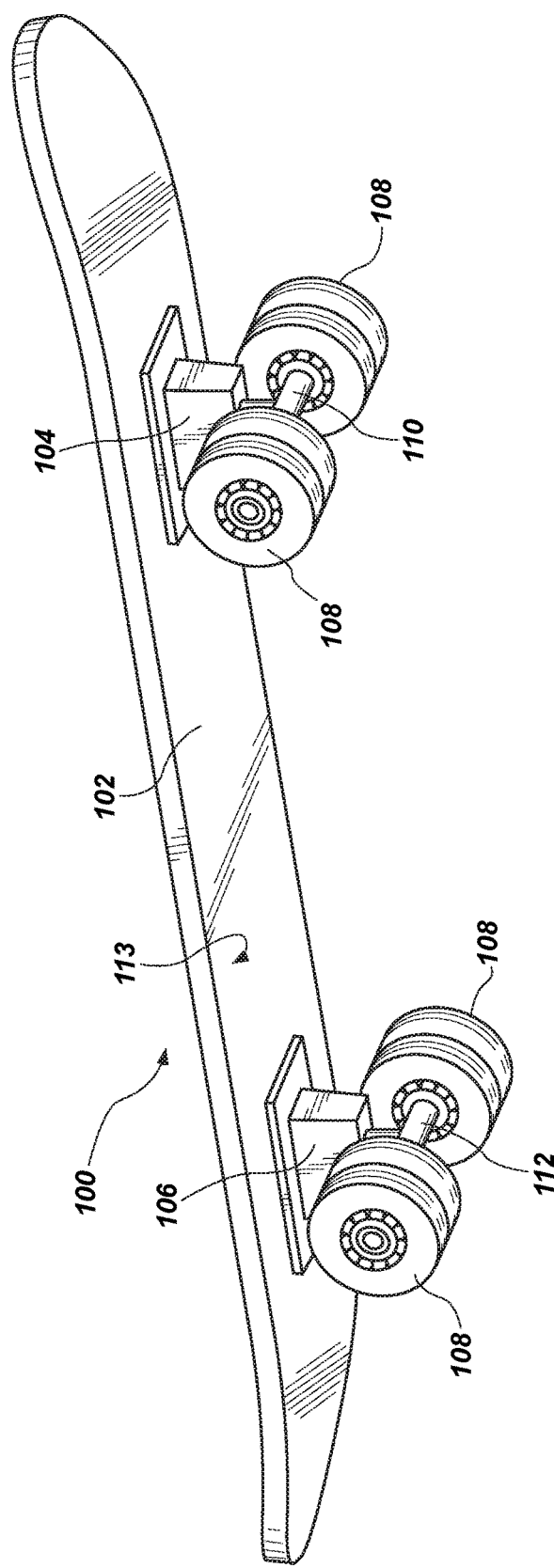
FIG. 1 is a perspective view of skateboard having a plurality of dual wheel assemblies according to an embodiment of the present disclosure.

FIG. 1 is a perspective view of skateboard 100 according to an embodiment of the present disclosure. The skateboard 100 may include a board portion 102, a first wheel hanger 104, a second wheel hanger 106, a plurality of dual wheel assemblies 108, a first axle 110, and a second axle 112. The first and second wheel hangers 104, 106 may be mounted to a bottom side 113 of the board portion 102. The first and second axles 110, 112 may be coupled to the first wheel hanger 104 and second wheel hanger 106, respectively. The first and second axles 110, 112 may extend longitudinally in directions that are at least substantially perpendicular to a direction in which the board portion 102 extends longitudinally. A dual wheel assembly 108 may be mounted to each longitudinal end portion of each of the first and second axles 110, 112.

Figure 2:
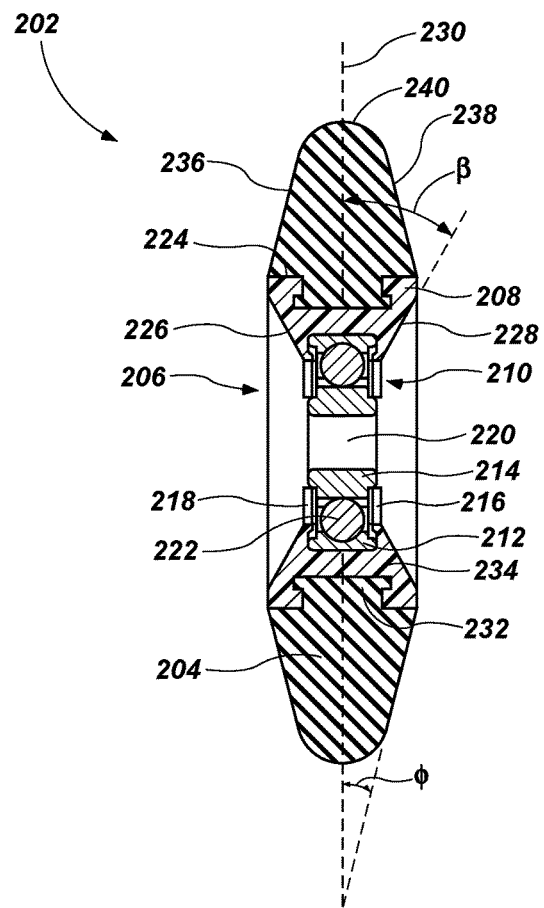
FIG. 2 is a side cross-sectional view of a wheel according to an embodiment of the present disclosure.
Figure 3:
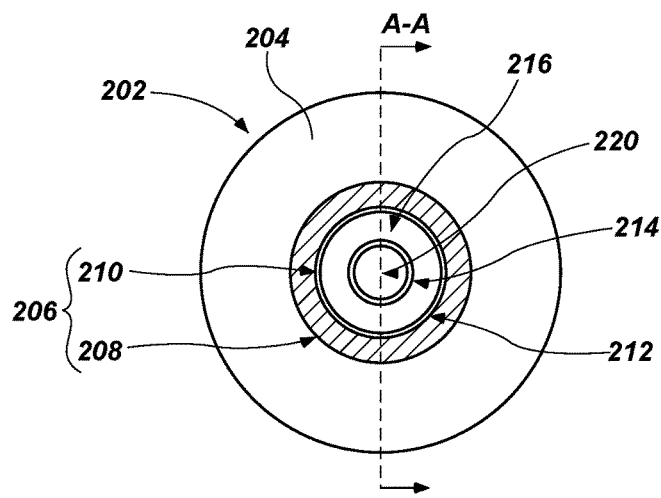
FIG. 3 is a side view of the wheel of FIG. 2.

FIG. 2 is a side cross-sectional view of a wheel 202 of a dual wheel assembly 108 (FIG. 1) taken from section line A-A of FIG. 3. FIG. 3 is a side view of the wheel 202 of FIG. 2. Referring to FIGS. 2 and 3 together, each wheel 202 of a dual wheel assembly 108 (FIG. 1) may include a tire portion 204 and a core 206. The core 206 may include an annular rim 208 and a bearing assembly 210 (e.g., a ball bearing assembly 210). The bearing assembly 210 may include an outer race ring 212, an inner race ring 214, a first annular covering 216, and a second annular covering 218. The inner race ring 214 may be disposed within the outer race ring 212 and may be concentric with the outer race ring 212. The inner race ring 214 may define borehole 220 extending through the inner race ring 214. A plurality of balls 222 may be disposed between the outer race ring 212 and the inner race ring 214. The first and second annular coverings 216, 218 may extend between the inner race ring 214 and the outer race ring 212 on both lateral sides of the inner race ring 214 and the outer race ring 212. For example, the bearing assembly 210 may include a conventional bearing assembly. The bearing assembly 210 may be disposed within the annular rim 208, and the outer race ring 212 of the bearing assembly 210 may be in contact with the annular rim 208.

The tire portion 204 of the wheel 202 may extend annularly around the annular rim 208 of the wheel 202. In some embodiments, the annular rim 208 may have two opposing lateral side surfaces 226, 228 that are tapered toward the outer race ring 212 of the bearing assembly 210 from a radially outer portion to a radially inner portion, as shown in FIG. 2. For example, the annular rim 208 may have a first width at an interface 224 between the annular rim 208 and the tire portion 204 and a second, narrower width where the annular rim 208 contacts the outer race ring 212 of the bearing assembly 210. In other words, an innermost peripheral portion of the annular rim 208 may have a narrower width than an outermost peripheral portion of the annular rim 208. Thus, each of the two opposing lateral side surfaces 226, 228 of the annular rim 208 may have a frustoconical shape. The two lateral side surfaces 226, 228 may extend radially inward and toward each other from the interface 224 between the annular rim 208 and the tire portion 204. An acute angle $\beta$ may be defined between each of the two lateral side surfaces 226, 228 of the annular rim 208 and a plane 230 extending through a center of the wheel 202 and orthogonal to an axis of rotation of the wheel 202. In some embodiments, the acute angle $\beta$ may be within the range of About 5° to about 25°. In some embodiments, the acute angle $\beta$ may be within the range of About 25° to about 45°. For example, the acute angle $\beta$ may be about 27°. In some embodiments, the acute angle $\beta$ may be within the range of About 45° to about 60°. In some embodiments, the acute angle $\beta$ may be within the range of about 60° to about 75°. In some embodiments, the acute angle $\beta$ may be within the range of about 75° to about 85°. The acute angle $\beta$ between the plane 230 and the first lateral side surface 226 may be the same as or different from the acute angle $\beta$ between the plane 230 and the second lateral side surface 228.

The interface 224 between the tire portion 204 of the wheel 202 and the annular rim 208 may include a flange 232 and groove 234. For example, the tire portion 204 may include a flange 232 extending along an inner peripheral side of the tire portion 204, and the annular rim 208 may have a groove 234 sized and shaped to receive the flange 232 of the tire portion 204. The groove 234 may extend along an outer peripheral side of the annular rim 208. Alternatively and conversely, in some embodiments the annular rim 208 may include a flange 232 and the tire portion 204 may include a complementary groove 234.

The tire portion 204 may have two opposing side surfaces 236, 238 and a radially outermost surface 240. The two opposing side surfaces 236, 238 may extend radially from the interface 224 between the annular rim 208 and the tire portion 204 and may terminate at the radially outermost surface 240 of the tire portion 204. For example, the radially outermost surface 240 may extend between the two side surfaces 236, 238 and may be for contacting a surface (e.g., the ground) upon which the wheel 202 of the skateboard 100 (FIG. 1) is to roll during use. In some embodiments, the tire portion 204 may be tapered toward the radially outermost surface 240 of the tire portion 204 from the interface 224 between the annular rim 208 and the tire portion 204. For example, the two side surfaces 236, 238 may extend radially outward from the interface 224 between the annular rim 208 and the tire portion 204 and at least partially toward each other. Thus, each of the two side surfaces 236, 238 of the tire portion 204 may have a frustoconical shape. An acute angle $\phi$ may be defined between each side surface 236, 238 of the tire portion 204 and the plane 230. In some embodiments, the acute angle $\phi$ may be within the range of about 10° to about 20°. In other embodiments, the acute angle $\phi$ may be within the range of about 20° to about 30°. For example, the acute angle $\phi$ may be about 22°. In other embodiments, the acute angle $\phi$ may be within the range of about 30° to about 45°.

In some embodiments, the radially outermost surface 240 may have a generally arcuate (e.g., circular arcuate, parabolic arcuate) shape when viewed from the cross-sectional perspective of FIG. 2. A generally arcuate shaped radially outermost surface 240 may provide more durable and faster wheels when compared to flat wheels. In other embodiments, the radially outermost surface 240 may have a generally linear (e.g., flat) shape when viewed from the cross-sectional perspective of FIG. 2. A generally linear shaped radially outermost surface 240 may provide wheels that grip a surface (e.g., dig in) better and may lead to more sliding while cornering, which may be desirable by some users.

Tapering the two side surfaces 236, 238 of the tire portion 204 toward the radially outermost surface 240 may provide advantages over other wheels known in the art for skateboards 100, roller skates, scooters, etc. For example, the tapering of the tire portion 204 may help the wheel 202 to navigate obstacles (e.g., rocks) that the wheel 202 may encounter when being used with a skateboard 100 (FIG. 1). For example, when the wheel 202 encounters an obstacle, rather than rolling over a top of the obstacle, the wheel 202 may push the obstacle to a lateral side of the wheel 202 (e.g., along the two opposing side surfaces 236, 238 of the tire portion 204) as a result of its shape and configuration. As a result, a user may experience fewer bumps while riding a skateboard 100 having wheels 202 as described in the present disclosure. Furthermore, by reducing bumps experienced by a user, crashes and/or injuries to the user may also be reduced. Moreover, using wheels 202 as described by the present disclosure may increase a ruggedness (e.g., roughness, bumpiness, etc.) of a terrain on which a skateboard 100 (FIG. 1) can be used. For example, the wheels 202 of the present disclosure may facilitate a skateboard 100 (FIG. 1) implementing the wheels 202 being ridden on a gravel road.

Moreover, when compared to conventional wide and flat tires commonly used with skateboards 100 and roller skates, the wheels 202 of the present disclosure may have less rolling resistance. As a result, skateboards 100 and rollers skates having the wheels 202 of the present disclosure may require less energy to ride, may achieve faster speeds, and may maintain speeds for longer periods of time in comparison to the wide and flat tires.

In some embodiments, the tire portion 204 may be formed from a polymeric material. For example, the tire portion 204 may include polyurethane. In some embodiments, the tire portion 204 may be formed from one or more of an elastic material or a plastic material. In some embodiments, the core 206 (the annular rim 208 and bearing assembly 210) may be press fit into the tire portion 204. In other embodiments, the core 206 may be coupled to the tire portion 204 by molding, tacking, gluing, screwing, or any other suitable methods known in the art.

In some embodiments, the core 206 may include a polymeric (e.g., plastic material). For example, one or more of the annular rim 208 or the bearing assembly 210 may be made from a plastic material. In other embodiments, the core 206 may include a metal material. For example, one or more of the annular rim 208 and the bearing assembly 210 may be made from a metal material. In some embodiments, the annular core 206 may be made from a plastic material and the bearing assembly 210 may be made from a metal material or vice-versa.

In some embodiments, the wheel 202 may not have a distinct annular rim 208. Rather, the portion of the wheel 202 comprising the annular rim 208 may be a portion of and integral with the tire portion 204. For example, the tire portion 204 may include an integral inner tapered portion that contacts the bearing assembly 210. Furthermore, similar to the annular rim 208, the inner tapered portion may be tapered toward the outer race ring 212 of the bearing assembly 210 and may define the acute angle $\beta$ between lateral side surfaces of the inner tapered portion and the plane 230.

Figure 4:
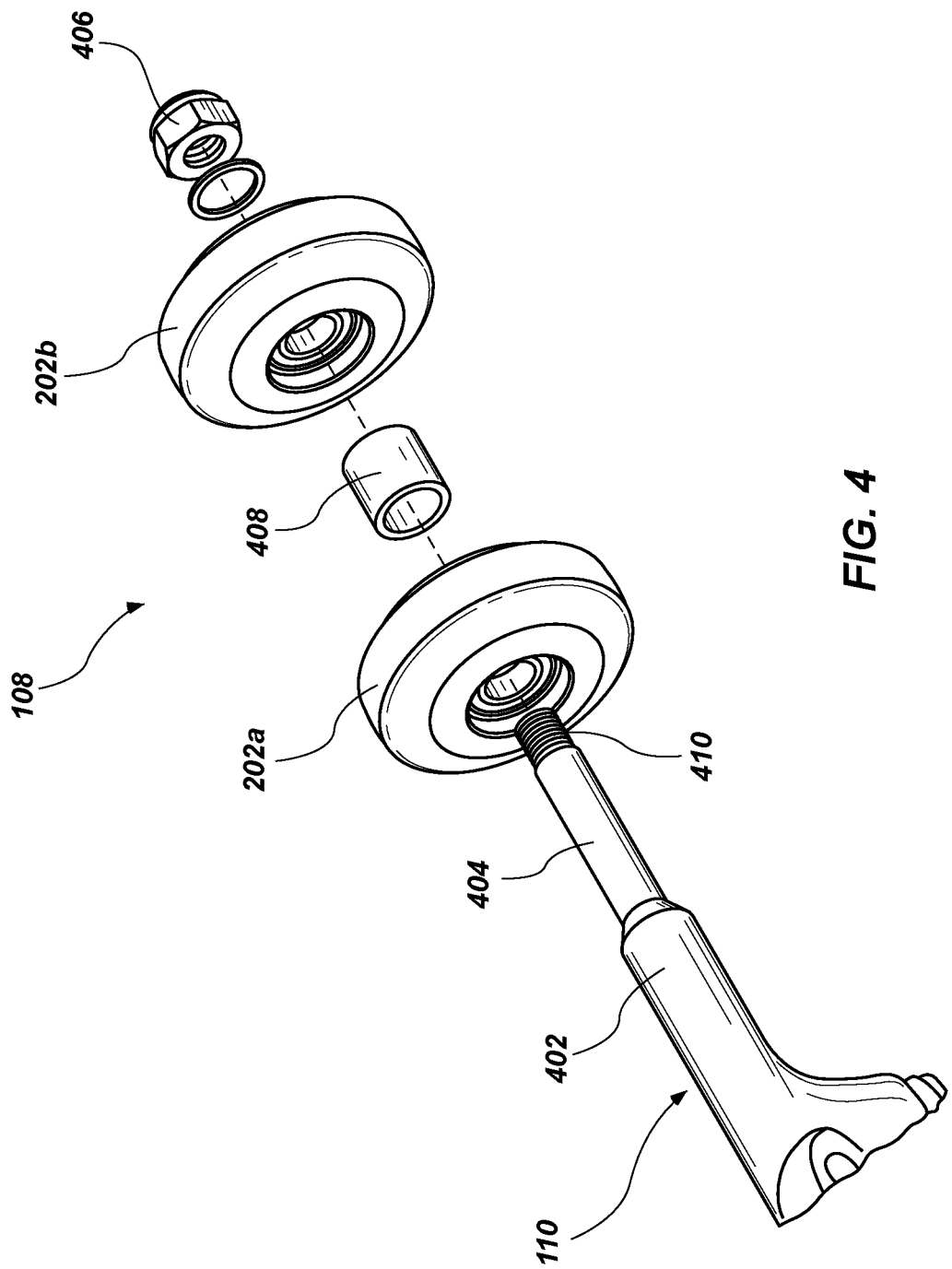
FIG. 4 is an exploded perspective view of an axle of a skateboard and a dual wheel assembly according to an embodiment of the present disclosure.
Figure 5:
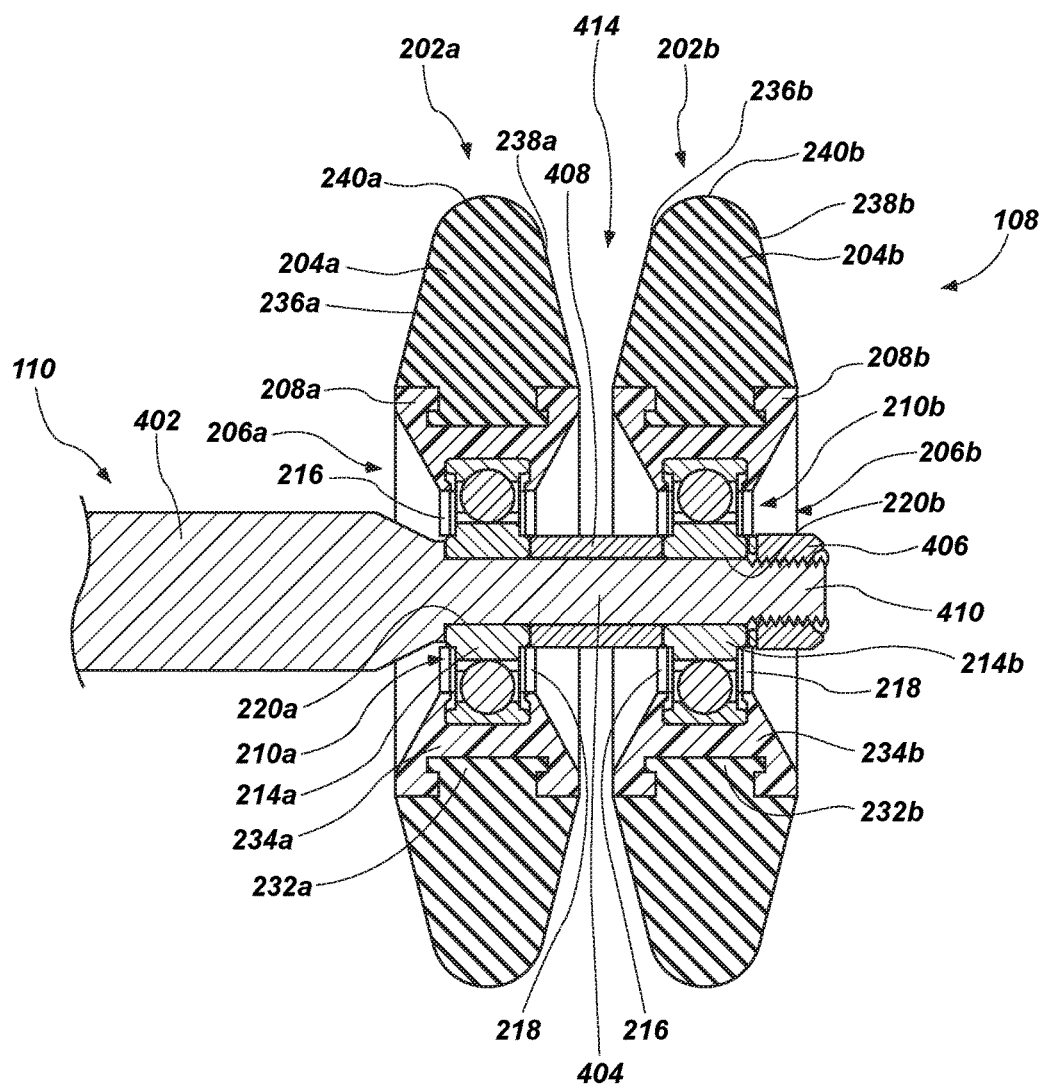
FIG. 5 is a side cross-sectional view of an assembled axle and dual wheel assembly according to an embodiment of the present disclosure.
Figure 6A:
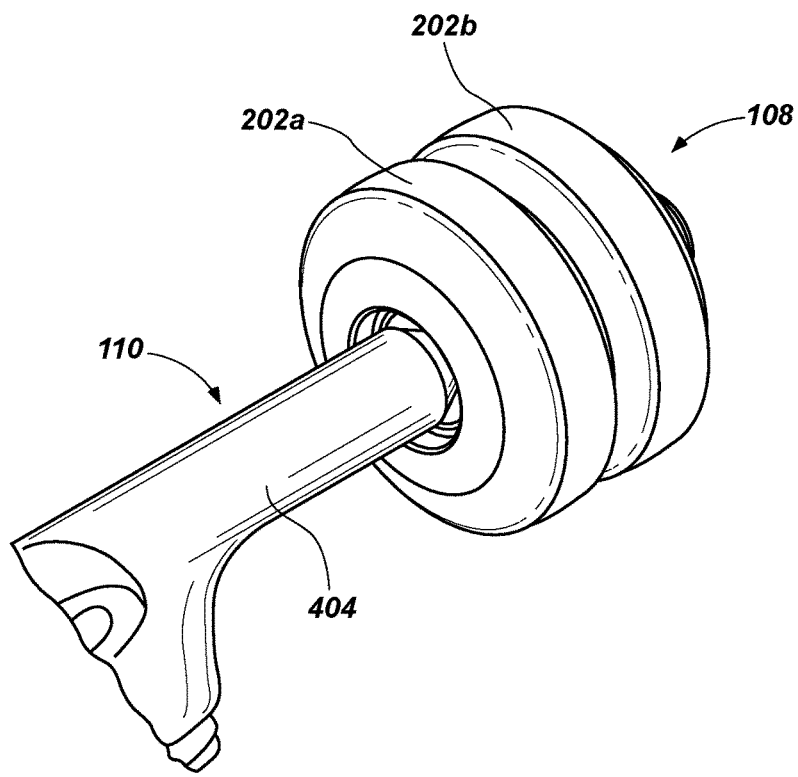
FIG. 6A is a perspective view of the axle and dual wheel assembly of FIG. 5.
Figure 6B:
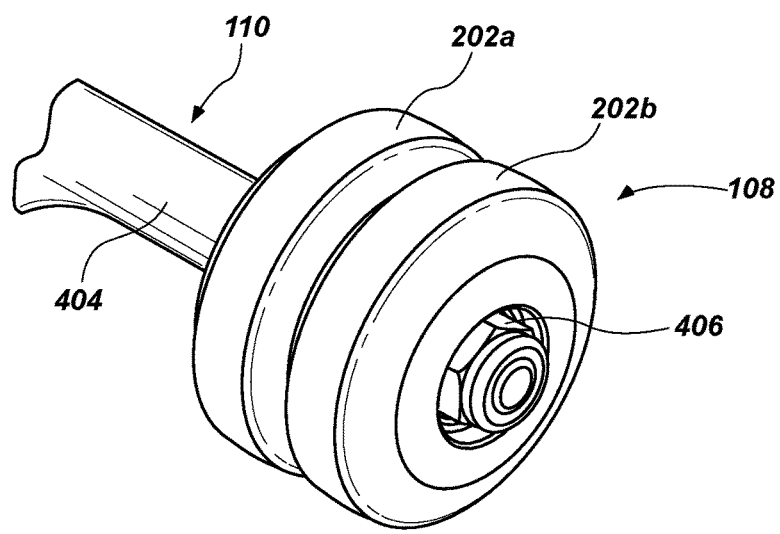
FIG. 6B is another perspective view of the axle and dual wheel assembly of FIG. 5.

FIG. 4 shows an exploded perspective view of an axle 110 and dual wheel assembly 108 of a skateboard 100 (FIG. 1) according to an embodiment of the present disclosure. FIG. 5 shows a side cross-sectional view of an assembled dual wheel assembly 108 on the axle 110 according to an embodiment of the present disclosure. FIGS. 6A and 6B show perspective views of the dual wheel assembly 108 of FIG. 5. Referring to FIGS. 4-6B together, each longitudinal end portion of each axle 110, 112 (FIG. 1) of the skateboard 100 may include a thick portion 402, a thin portion 404, and threaded end 410 for engagement by a nut 406 (e.g., a locking nut 406). The dual wheel assembly 108 may include a first wheel 202a, a second wheel 202b, and a spacer 408 disposed between the first wheel 202a and the second wheel 202b.

The thin portion 404 of the axle 110 may extend from the thick portion 402 and may be coaxial with the thick portion 402. In other words, a thin portion 404 may extend from each longitudinal end of the thick portion 402 of each axle 110. The thick portion 402 of the axle 110 may be attachable to a wheel 202 hanger (FIG. 1) of the skateboard 100 (FIG. 1). The thin portion 404 may have a diameter that is smaller than a diameter of the thick portion 402. The thin portion 404 may include a threaded end 410 on a distal end of the thin portion 404 opposite the thick portion 402. The threaded end 410 may be sized and shaped to receive the nut 406 thereon.

The first wheel 202a of the dual wheel assembly 108 may be disposed on the thin portion 404 of axle 110 adjacent to the thick portion 402 of the axle 110. The thin portion 404 of the axle 110 may extend through the borehole 220a of the bearing assembly 210a of the first wheel 202a. In some embodiments, the inner race ring 214a of the bearing assembly 210a of the first wheel 202a may abut against the thick portion 402 of the axle 110. At least a portion of the first wheel 202a of the dual wheel assembly 108 may be rotatable about the axle 110. For example, at least the tire portion 204a and annular rim 208a of the first wheel 202a may be rotatable about the axle 110. In some embodiments, the inner race ring 214a of the bearing assembly 210a of the first wheel 202a may be at least substantially fixed relative to the axle 110 and the outer race ring 212a of the bearing assembly 210a may be rotatable about the axle 110.

The spacer 408 may be disposed on the thin portion 404 of the axle 110 with the thin portion 404 extending through the spacer 408. The spacer 408 may be disposed adjacent to first wheel 202a and may abut against the second annular covering 218a of the bearing assembly 210a of the first wheel 202a. In some embodiments, the spacer 408 may be in the form of a sleeve, as shown in FIG. 4, for example. In other embodiments, the spacer 408 may include a washer or a plurality of washers.

The second wheel 202b may be disposed on the thin portion 404 of the axle 110 with the thin portion 404 of the axle 110 extending through the borehole 220b of the bearing assembly 210b of the second wheel 202b. The second wheel 202b may be disposed adjacent to the spacer 408, and the spacer 408 may abut against the inner race ring 214b of the bearing assembly 210b of the second wheel 202b. The spacer 408 may inhibit the tire portions 204a, 204b of the first and second wheels 202a, 202b from contacting each other while rotating during use. The first and second wheels 202a, 202b may be rotatable relative to one another. Furthermore, the first wheel 202a may be rotatable in directions parallel to the directions in which the second wheel 202b is rotatable.

The nut 406 may be engaged with the threaded end 410 of the thin portion 404 of the axle 110. In some embodiments, the nut 406 may include a washer and a nut, or more than one nut. The nut 406 may be rotated relative to the threaded end 410 of the thin portion 404 of the axle 110 (e.g., tightened) until the nut 406 abuts against the second wheel 202b. For example, the nut 406 may abut against the inner race ring 214b of the bearing assembly 210b of the second wheel 202b. Furthermore, when tightened, the nut 406, in conjunction with the spacer 408, may at least substantially prevent the first and second wheels 202a, 202b from travelling axially along a longitudinal axis of the axle 110 during use. In other words, the nut 406 and spacer 408 may inhibit the first and second wheels 202a, 202b from wobbling or sliding along the axle 110 during use. Additionally, because the annular rim 208b of the second wheel 202b is tapered, as described above in regard to FIGS. 2 and 3, the nut 406 may be at least partially recessed and may be at least partially protected from impacts during normal use of the skateboard 100 (FIG. 1).

Due to the tapering of surfaces of the tire portions 204a, 204b of the first and second wheels 202a, 202b, as discussed above in regard to FIGS. 2 and 3, and due to the presence of the spacer 408, there may be space 414 (e.g., trough) between the radially outermost surface 240a of the first wheel 202a and the radially outermost surface 240b of the second wheel 202. The space 414 between the radially outermost surfaces 240a, 240b of the first and second wheels 202a, 202b may provide advantages over other wheels known in the art for skateboards 100 (FIG. 1). For example, the space 414 may help the dual wheel assembly 108 to navigate obstacles (e.g., rocks) that the dual wheel assembly 108 may encounter when being used with a skateboard 100. For example, when the dual wheel assembly 108 encounters an obstacle, rather than rolling over a top of the obstacle, the dual wheel assembly 108 may push the obstacle to a lateral side of the first and second wheels 202a, 202b (e.g., along the two opposing side surfaces 236a, 236b, 238a, 238b of the tire portions 204a, 204b of the first and second wheels 202a, 202b). Accordingly, the obstacles may be pushed between the first wheel 202a and the second wheel 202b and into the space 414 or to outside lateral sides of the first and second wheels 202a, 202b. As a result, a user may experience fewer bumps while riding a skateboard 100 with dual wheel assemblies 108 as described in the present disclosure. Furthermore, by reducing bumps experienced by a user, crashes and/or injuries to the user may also be reduced. Moreover, using the dual wheel assemblies 108 as described by the present disclosure may increase a ruggedness (e.g., roughness, bumpiness, etc.) of a terrain on which a skateboard 100 (FIG. 1) can be used. For example, the dual wheel assemblies 108 of the present disclosure may facilitate a skateboard 100 (FIG. 1) being ridden on a gravel road.

Moreover, unlike known grooves that may be cut into conventional wide and flat tires, which tend to become full of dirt, tar, and other debris, the space 414 may be sufficiently wide and deep to not become full of debris. Furthermore, because the first and second wheels 202a, 202b of the dual wheel assembly 108 rotate relative to one another, the relative rotation of the first and second wheels 202a, 202b may naturally clear debris from the space 414.

Furthermore, wide and flat tires tend to at least partially brake during turns. For example, during a turn, an outermost portion of the wide and flat tire experiences different forces (e.g., frictional forces) than an innermost portion of the wide and flat tire resulting from the innermost and outermost portions traveling along arcs of different radiuses. This leads to slipping of at least portions of the wide and flat tire relative to the ground and natural braking during turns, which can reduce speeds and lead to unpredictable turning radiuses. On the other hand, the dual wheel assembly 108, by having two distinct wheels configured to rotate at different speeds, allows the two separate wheels to rotate at different speeds. Therefore, the dual wheel assembly 108 does not experience the natural braking or slipping to the same levels of the wide and flat tires. As a result, less speed is lost during turns and turning radiuses are more predictable, which may lead to a more enjoyable and safe riding experience for a user.

Additionally, a conventional wide and flat tire has only one surface for traction, and therefore, requires a large contact area to achieve sufficient traction to properly rotate the wide and flat tire. Roads are often uneven and do not provide a sufficiently large contact area for the wide and flat tires. As a result, the wide and flat tires often slip and slide causing the wide and flat tires to wear out more quickly. In contrast, the dual wheel assembly 108 has a surface (e.g., radially outermost surfaces 240a, 240b) on each of the first and second wheels 202a, 202b and does not require as large of a contact area to achieve sufficient traction to properly rotate the wheel 202. Accordingly, the first and second wheels 202a, 202b of the dual wheel assembly 108 may provide better traction than conventional wide and flat tires and may have a longer lifetime.

The dual wheel assembly 108 of the present disclosure may also be lighter and may require less material to manufacture than conventional wide and flat tires. As a result, the dual wheel assembly 108 may be less expensive to manufacture and may provide a less expensive option to users.

Another problem with wide and flat tires is that the tires tend to wear unevenly due to the different forces experienced during turns on different portions of the tires. As a result, the entire wheel often has to be replaced when just a portion of it has been worn or damaged. On the other hand, the dual wheel assembly 108 allows a user to replace only the wheel that has experienced wear or damage. Accordingly, the dual wheel assembly 108 may lead to cost savings for a user.

Some embodiments of the present disclosure include wheel assemblies having more than two wheels. For example, the wheel assemblies may include three or four wheels.

Although the dual wheel assembly 108 is described herein as being used with a skateboard 100 (FIG. 1), the disclosure is not so limited. The dual wheel assembly 108 may be used with roller skates, inline skates, scooters, longboards, skate shoes, moving carts, etc.

Some embodiments of the present disclosure include a dual wheel assembly 108 having a single bearing assembly attached to both of the first and second tire portions 204a, 204b.

Figure 7:
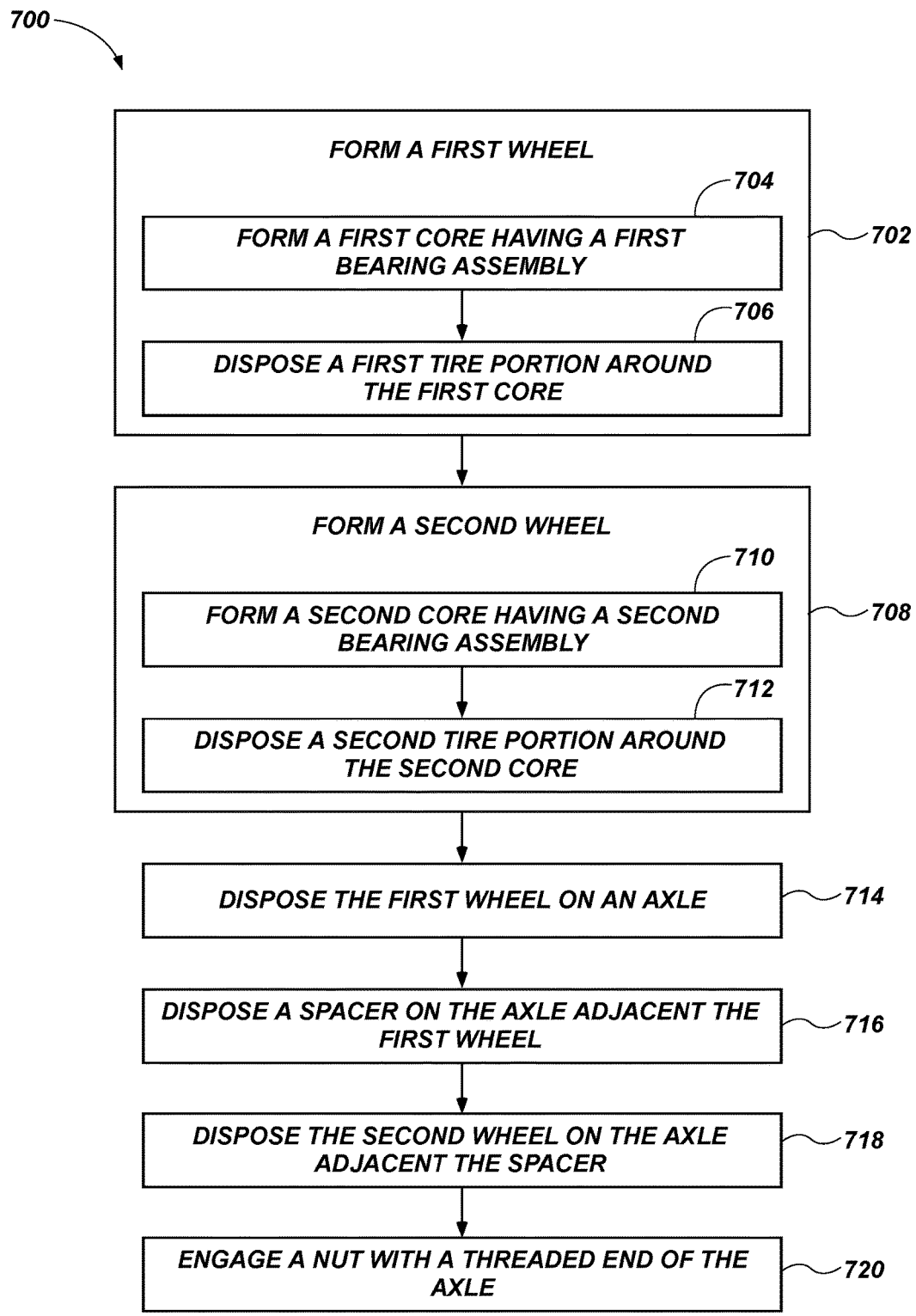
FIG. 7 shows a flowchart of acts of a method of making a dual wheel assembly according to an embodiment of the present disclosure.

FIG. 7 shows a flowchart of actions of a method 700 of making a dual wheel assembly 108 according to an embodiment of the present disclosure. Referring to FIGS. 1, 2, 4, 5, and 7 together, the method 700 may include forming a first wheel 202a, as represented in act 702.

Forming the first wheel 202a may include forming a first core 206a to have a first bearing assembly 210a (e.g., a first ball bearing assembly 210a) and a first annular rim 208a, as represented in act 704. Forming the first wheel 202a may also include disposing a first tire portion 204a around the first core 206a, as represented in act 706. The first tire portion 204a may be disposed around the first core 206a through one or more of press fitting, molding, tacking, gluing, screwing, or any other methods known in the art. In some embodiments, disposing the first tire portion 204a around the first core 206a may include disposing a first flange 232a of the first tire portion 204a in a first groove 234a of the first annular rim 208a of the first core 206a, or, conversely, disposing a first flange 232a of the first annular rim 208a in a first groove 234a of the first tire portion 204a.

The method 700 may further include forming a second wheel 202b, as represented in act 708. Forming the second wheel 202b may include forming a second core 206b to have a second bearing assembly 210b (e.g., a second ball bearing assembly 210b) and a second annular rim 208b, as represented in act 710. Forming the second wheel 202b may also include disposing a second tire portion 204b around the second core 206b, as represented in act 712. In some embodiments, disposing the second tire portion 204b around the second core 206b may include disposing a second flange 232b of the second tire portion 204b in a second groove 234b of the second annular rim 208b of the second core 206b, or, conversely, disposing a second flange 232b of the second annular rim 208b in a second groove 234b of the second tire portion 204b.

Although the method 700 illustrated in FIG. 7 includes forming a first core 206a having a first bearing assembly 210a and a first annular rim 208a and forming a second core 206b having a second bearing assembly 210b and a second annular rim 208b, the present disclosure is not so limited. For example, a suitable commercially available bearing assembly may be selected for the first core 206a and the second core 206b.

The first wheel 202a may be disposed on an axle 110, as represented in act 714. Disposing the first wheel 202a on an axle 110 may include inserting a thin portion 404 of the axle 110 through a first borehole 220a of the first bearing assembly 210a of the first wheel 202a. The first wheel 202a may be abutted against a thick portion 402 of the axle 110.

A spacer 408 may be disposed on the axle 110 adjacent to the first wheel 202a, as represented in act 716. Disposing the spacer 408 on the axle 110 may include inserting the thin portion 404 of the axle 110 through the spacer 408 and abutting the spacer 408 against the first wheel 202a. In some embodiments, disposing the spacer 408 on the axle 110 may include disposing a sleeve on the axle 110. In other embodiments, disposing the spacer 408 on the axle 110 may include disposing a washer or a plurality of washers on the axle 110.

The second wheel 202b may be disposed on an axle 110, as represented in act 718. Disposing the second wheel 202b on an axle 110 may include inserting the thin portion 404 of the axle 110 through a second borehole 220b of the second bearing assembly 210b of the second wheel 202b and abutting the second wheel 202b against the spacer 408.

A nut 406 (e.g., a locking nut 406) may be engaged with a threaded end 410 of the thin portion 404 of the axle 110, as represented in act 720. The nut 406 may be tightened until the nut 406 abuts against the second core 206b of the second wheel 202b.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternative useful combinations of the elements described, will become apparent to those skilled in the art from the description. Such modifications and embodiments also fall within the scope of the appended claims and equivalents.

What is claimed is:

1. A dual wheel assembly for a skateboard, comprising:
a first wheel disposed on a longitudinal end portion of an axle;
a spacer disposed on the longitudinal end portion of the axle adjacent to the first wheel and abutting against the first wheel; and
a second wheel disposed on the longitudinal end portion of the axle adjacent to the spacer and abutting against the spacer, wherein the first wheel is separated from the second wheel by a distance by the spacer, wherein each of the first wheel and the second wheel comprises:
a bearing assembly;
an annular rim coupled to and extending annularly around the bearing assembly; and
a tapered tire portion coupled to and extending annularly around the annular rim, the tire portion comprising:
a first frustoconical side surface;
a second opposite frustoconical side surface; and
a radially outermost surface extending between the first frustoconical side surface and the second opposite frustoconical side surface, wherein a first acute angle may be defined between each of the first frustoconical side surface and the second opposite frustoconical side surface and a plane extending through a center of each of the first wheel and the second wheel and orthogonal to an axis of rotation of each of the first wheel and the second wheel,
wherein the annular rim comprises two lateral side surfaces extending from an interface between the annular rim and the tire portion to an interface between the annular rim and the bearing assembly, wherein a second acute angle may be defined between each of the two lateral side surfaces and the plane extending through the center of each of the first wheel and the second wheel.

2. The dual wheel assembly of claim 1, wherein the first acute angle is within a range of about 10° to about 20°.

3. The dual wheel assembly of claim 1, wherein the first acute angle is within a range of about 20° to about 30°.

4. The dual wheel assembly of claim 1, wherein the second acute angle is within a range of about 25° to about 45°.

5. The dual wheel assembly of claim 1, wherein the second acute angle is within a range of about 45° to about 60°.

6. The dual wheel assembly of claim 1, wherein the second acute angle is within a range of about 60° to about 75°.

7. The dual wheel assembly of claim 1, wherein the tire portion comprises a flange extending along an inner peripheral side thereof; and
wherein the annular rim comprises a groove for receiving the flange of the tire portion, the flange extending along an outer peripheral side of the annular rim.

8. A dual wheel assembly for a skateboard, comprising:
a first wheel disposed on a longitudinal end portion of an axle;

a spacer disposed on the longitudinal end portion of the axle adjacent to the first wheel and abutting against the first wheel;

a second wheel disposed on the longitudinal end portion of the axle adjacent to the spacer and abutting against the spacer, wherein the first wheel is separated from the second wheel by a distance by the spacer; and a nut disposed on the longitudinal end portion of the axle adjacent to the second wheel and abutting against the second wheel, wherein the longitudinal end portion of the axle comprises:

a thick portion; and a thin portion extending from the thick portion and being coaxial with the thick portion, wherein the first wheel, the second wheel, the spacer, and the nut are disposed on the thin portion of the longitudinal end portion of the axle and wherein the first wheel abuts against the thick portion of the longitudinal end portion of the axle.

9. A method of making a dual wheel assembly for a skateboard, the method comprising:

disposing a first wheel on a thin portion of an axle and abutting the first wheel against a thick portion of the axle;

disposing a spacer on the thin portion of the axle adjacent to the first wheel; and disposing a second wheel on the thin portion of the axle adjacent to the spacer, the spacer separating the first wheel from the second wheel by a distance.

10. The method of claim 9, further comprising abutting the first wheel and the second wheel against opposing ends of the spacer.

11. The method of claim 9, further comprising selecting each of the first wheel and the second wheel to comprise a tire portion coupled to a core.

12. The method of claim 11, further comprising selecting each of the first wheel and the second wheel to comprise a flange of the tire portion disposed into a groove of the core.

13. The method of claim 11, further comprising selecting each of the first wheel and the second wheel to comprise:

a bearing assembly disposed into an annular rim; and the bearing assembly and annular rim coupled to a tire portion.

14. The method of claim 9, wherein disposing the first wheel on the thin portion of the axle comprises:

inserting the thin portion of a longitudinal end portion of the axle through a borehole of a bearing assembly of the first wheel; and abutting the bearing assembly of the first wheel against a thick portion of the axle.

* * * * *

UNITED STATES PATENT AND TRADEMARK OFFICE
CERTIFICATE OF CORRECTION

Page 1 of 1

PATENT NO. : 9,737,789 B2
APPLICATION NO. : 14/988299
DATED : August 22, 2017
INVENTOR(S) : Paul Brooks It is certified that error appears in the above-identified patent and that said Letters Patent is hereby corrected as shown below:

In the Specification

| | | |
|---|---|---|
| Column 4, | Line 20, | change "About 5° to" to --about 5° to-- |
| Column 4, | Line 21, | change "of About 25° to" to --of about 25° to-- |
| Column 4, | Line 24, | change "About 45° to about" to --about 45° to about-- |

Signed and Sealed this
Twenty-second Day of May, 2018

Andrei Iancu
*Director of the United States Patent and Trademark Office*